US010705626B2

(12) United States Patent
Takano (10) Patent No.: US 10,705,626 B2
(45) Date of Patent: Jul. 7, 2020

(54) IMAGE DISPLAY DEVICE AND CONTROL METHOD FOR IMAGE DISPLAY DEVICE (71) Applicant: SEIKO EPSON CORPORATION, Tokyo (JP)

(72) Inventor: Hitoshi Takano, Beppu (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/198,983

(22) Filed: Nov. 23, 2018

(65) Prior Publication Data
US 2019/0163289 A1 May 30, 2019

(30) Foreign Application Priority Data
Nov. 24, 2017 (JP) ................. 2017-225484

(51) Int. Cl.
G06F 3/0354 (2013.01)
G06F 3/042 (2006.01)
G06F 3/0488 (2013.01)

(52) U.S. Cl.
CPC ...... G06F 3/03542 (2013.01); G06F 3/03545 (2013.01); G06F 3/0425 (2013.01); G06F 3/0488 (2013.01)

(58) Field of Classification Search
CPC . G06F 3/03542; G06F 3/03545; G06F 3/0425
See application file for complete search history.

(56) References Cited

U.S. PATENT DOCUMENTS

| 9,778,763 B2 | 10/2017 | Nagao | |
| 9,857,918 B2* | 1/2018 | Okabayashi | G06F 3/017 |
| 9,990,259 B1* | 6/2018 | Niedzielski | H04L 69/40 |
| 2015/0205392 A1* | 7/2015 | Kim | G06F 3/03545 345/179 |
| 2016/0162050 A1 | 6/2016 | Nagao | |

FOREIGN PATENT DOCUMENTS

JP 2005-284559 A 10/2005
JP 2016-110436 A 6/2016

* cited by examiner

Primary Examiner — Michael Pervan
(74) Attorney, Agent, or Firm — Oliff PLC (57) ABSTRACT A projector includes: a position detection unit which detects a designated position (XYZ coordinates) designated by a light pen; and a mode changing unit which determines that an operation button provided on the light pen is operated, and which changes a drawing mode if it is determined that the operation button is operated. The mode changing unit: changes the drawing tool if the Z coordinate of the designated position when it is determined that the operation button is operated is within a first distance range; changes the color of the pen if the Z coordinate of the designated position when it is determined that the operation button is operated is within a second distance range; and changes the thickness of the pen or the like if the Z coordinate of the designated position when it is determined that the operation button is operated is within a third distance range.

8 Claims, 7 Drawing Sheets

| DRAWING MODE | DRAWING TOOL | COLOR | THICKNESS |
|---|---|---|---|
| M1 | PEN | BLACK | THIN |
| M2 | PEN | BLACK | THICK |
| M3 | PEN | RED | THIN |
| M4 | PEN | RED | THICK |
| M5 | ERASER | BLACK | THIN |
| M6 | ERASER | BLACK | THICK |
| M7 | ERASER | RED | THIN |
| M8 | ERASER | RED | THICK |

IMAGE DISPLAY DEVICE AND CONTROL METHOD FOR IMAGE DISPLAY DEVICE

CROSS-REFERENCE

The entire disclosure of Japanese Patent Application No. 2017-225484, filed Nov. 24, 2017 is expressly incorporated by reference herein.

BACKGROUND

1. Technical Field

The present invention relates to an image display device which displays an image and a control method for the same.

2. Related Art

A system which enables various operations with a touch pen on a screen projected by a projector is known (see, for example, JP-A-2005-284559). In the system disclosed in JP-A-2005-284559, the color or the like of a drawing on the screen can be switched or an instruction about an operation (end or the like) can be given by an operation with a touch pen on a tool bar displayed on the screen.

However, in the configuration where an instruction is given using a tool bar, a part of the screen may be hidden below the tool bar, or the user must move to the position where the toolbar is displayed. This may result in less convenience for the user.

SUMMARY

An advantage of some aspects of the invention is to solve at least a part of the problems described above, and the invention can be implemented as the following configurations or application examples.

Application Example 1

An image display device according to this application example displays an image on a display surface. The device includes: a position detection unit which detects a designated position designated by a pointer on the display surface; a distance detection unit which detects a distance between the display surface and the pointer; a determination unit which determines that an operation unit provided on the pointer is operated; and a processing unit which carries out predetermined processing if it is determined that the operation unit is operated. The processing unit carries out first processing if the distance when it is determined that the operation unit is operated is a first distance. The processing unit carries out second processing which is different from the first processing if the distance when it is determined that the operation unit is operated is a second distance which is different from the first distance.

In this image display device, the processing unit carries out different kinds of processing according to the distance between the pointer and the display surface when it is determined that the operation unit provided on the pointer is operated. This configuration enables the user to easily make the image display device carry out various kinds of processing without using a tool bar, and thus improves convenience for the user.

Application Example 2

It is desirable that the image display device according to the application example further includes a generation unit which generates a drawn image, based on a trajectory of the designated position, and a display unit which displays the drawn image on the display surface. It is also desirable that if a drawing mode for the generation of the drawn image is a first mode and the distance when it is determined that the operation unit is operated is the first distance, the processing unit changes the drawing mode to a second mode which is different from the first mode, and that if the drawing mode is the first mode and the distance when it is determined that the operation unit is operated is the second distance, the processing unit changes the drawing mode to a third mode which is different from the first mode and the second mode. It is also desirable that the generation unit generates the drawn image in a form corresponding to the drawing mode changed by the processing unit.

In this image display device, the processing unit changes the drawing mode according to the distance between the pointer and the display surface when the operation unit provided on the pointer is operated. This configuration enables the user to easily change the form of the drawn image without using a tool bar, and thus improves convenience for the user.

Application Example 3

In the image display device according to the application example, it is desirable that each of the drawing modes is decided based on a first parameter and a second parameter. It is desirable that the second mode is a drawing mode in which the first parameter is changed from the first mode and in which the second parameter is not changed, and that the third mode is a drawing mode in which the second parameter is changed from the first mode and in which the first parameter is not changed.

In this image display device, in the drawings modes decided based on a plurality of parameters, different parameters are changed according to the distance between the pointer and the display surface when the operation unit provided on the pointer is operated. This configuration enables the user to easily change a desired parameter, of the plurality of parameters constituting the drawing modes.

Application Example 4

In the image display device according to the application example, the first mode may be a drawing mode for drawing along the trajectory of the designated position. The second mode may be a drawing mode for erasing the drawn image which is already drawn, along the trajectory of the designated position.

This image display device can easily switch between the drawing mode for drawing along the trajectory of the designated position and the drawing mode erasing the already drawn image along the trajectory of the designated position.

Application Example 5

In the image display device according to the application example, the first mode may be a drawing mode for drawing a line in a first color along the trajectory of the designated position. The second mode may be a drawing mode for drawing a line in a second color which is different from the first color, along the trajectory of the designated position.

This image display device can easily switch between the drawing mode for drawing a line in the first color along the trajectory of the designated position and the drawing mode for drawing a line in the second color.

Application Example 6

In the image display device according to the application example, the first mode may be a drawing mode for drawing a line with a first thickness along the trajectory of the designated position. The second mode may be a drawing mode for drawing a line with a second thickness which is different from the first thickness, along the trajectory of the designated position.

This image display device can easily switch between the drawing mode for drawing a line with the first thickness along the trajectory of the designated position and the drawing mode for drawing a line with the second thickness.

Application Example 7

It is desirable that the image display device according to the application example further includes an operation setting unit which establishes a correspondence between the distance and processing by the processing unit.

This image display device has the operation setting unit, which establishes a correspondence between the distance and processing. This configuration enables the user to arbitrarily set a correspondence between the distance and processing.

Application Example 8

In the image display device according to the application example, it is desirable that the second distance is longer than the first distance and that a distance range corresponding to the second distance is broader than a distance range corresponding to the first distance.

With this image display device, the distance range corresponding to the distance becomes broader as it goes away from the display surface. This configuration can compensate for a reduction in accuracy as it goes away from the display surface when the user estimates the distance between the pointer and the display surface.

Application Example 9

A control method for an image display device according to this application example is a control method for an image display device which displays an image on a display surface. The method includes: detecting a designated position designated by a pointer on the display surface; detecting a distance between the display surface and the pointer; determining that an operation unit provided on the pointer is operated; and carrying out first processing if the distance when it is determined that the operation unit is operated is a first distance, and carrying out second processing which is different from the first processing if the distance when it is determined that the operation unit is operated is a second distance which is different from the first distance.

In this control method for the image display device, different kinds of processing are carried out according to the distance between the pointer and the display surface when it is determined that the operation unit provided on the pointer is operated. This configuration enables the user to easily make the image display device carry out various kinds of processing without using a tool bar, and thus improves convenience for the user.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an image projection system according to an embodiment will be described with reference to the drawings.

Figure 1:
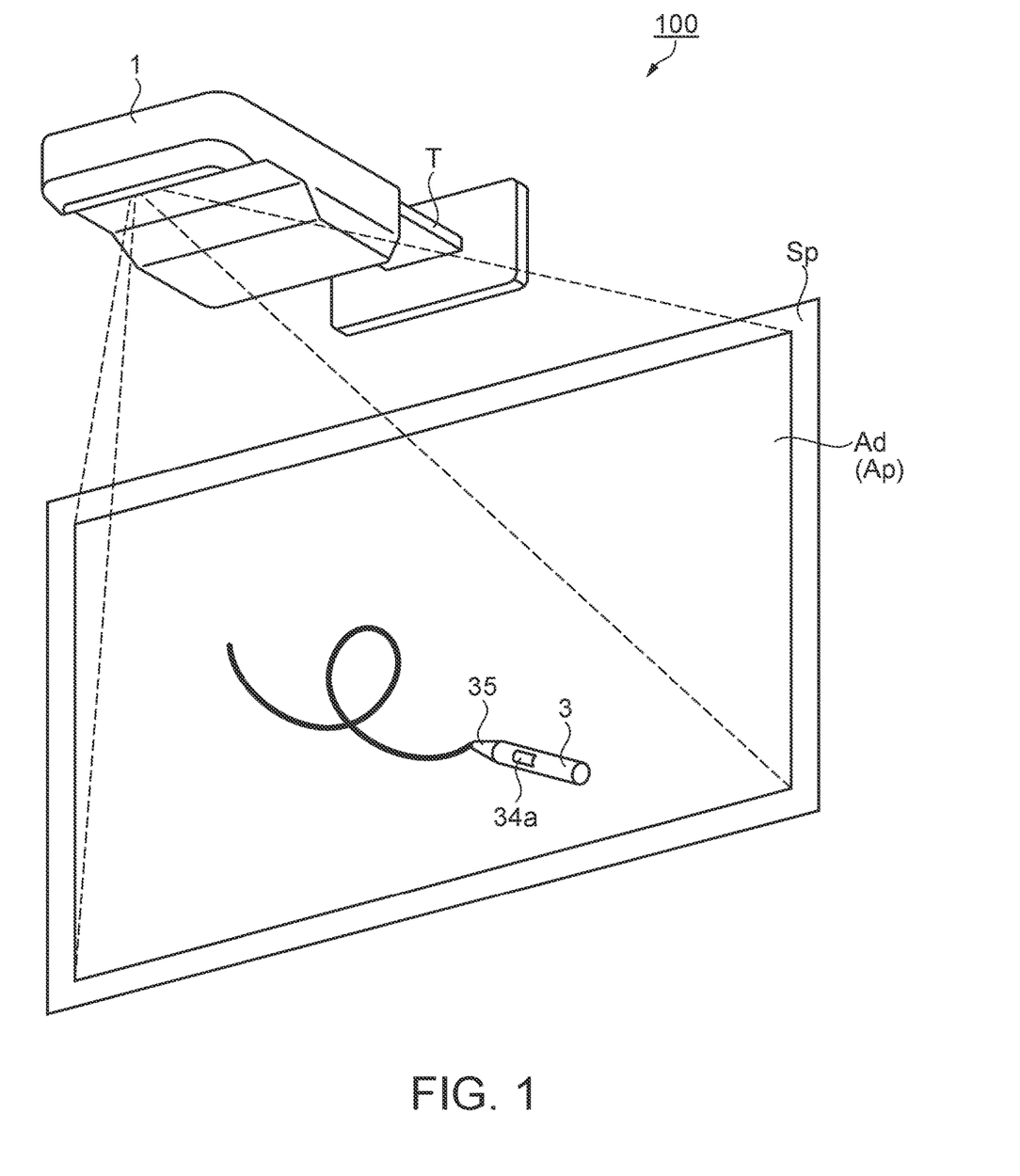
FIG. 1 is a perspective view showing an image projection system.

FIG. 1 is a perspective view showing an image projection system 100 according to this embodiment.

As shown in FIG. 1, the image projection system 100 has a projector 1 as an image display device and a light pen 3 as a pointer. The projector 1 projects an image (hereinafter also referred to as "input image") based on image information inputted from outside or image information stored inside in advance, onto a projection surface Sp as a display surface. The projector 1 in this embodiment is fixed to a wall surface via a fixing member T and projects an image toward the projection surface Sp arranged along the same wall surface. As the projection surface Sp, for example, a screen, whiteboard or the like can be used. However, an image may be projected on the wall surface itself.

The projector 1 can pick up an image over a range including a detection area Ad on the projection surface Sp and can detect a position (designated position) designated by the light pen 3 in the detection area Ad, based on the position of light emitted from a light emitting unit 35 of the light pen 3. Therefore, if a user carries out an operation such as drawing on the projection surface Sp with the light pen 3, the projector 1 can project an image (hereinafter also referred to as "drawn image") such as a line drawn along the trajectory of the designated position, as superimposed on the input image projected up to this point. An operation button 34a as an operation unit is provided on the lateral side of the light pen 3. By operating (pressing) the operation button 34a, the user can change a drawing mode that prescribes the form of the drawing (for example, the color, thickness and the like of the drawn line).

In this embodiment, the detection area Ad, where the designated position can be detected, is considered to be equal to a projection area Ap where an image is projected from the projector 1. However, the detection area Ad may be broader or narrower than the projection area Ap. Also, while the light pen 3 in the embodiment emits infrared light, the light pen 3 may emit light in other wavelength ranges.

Figure 2:
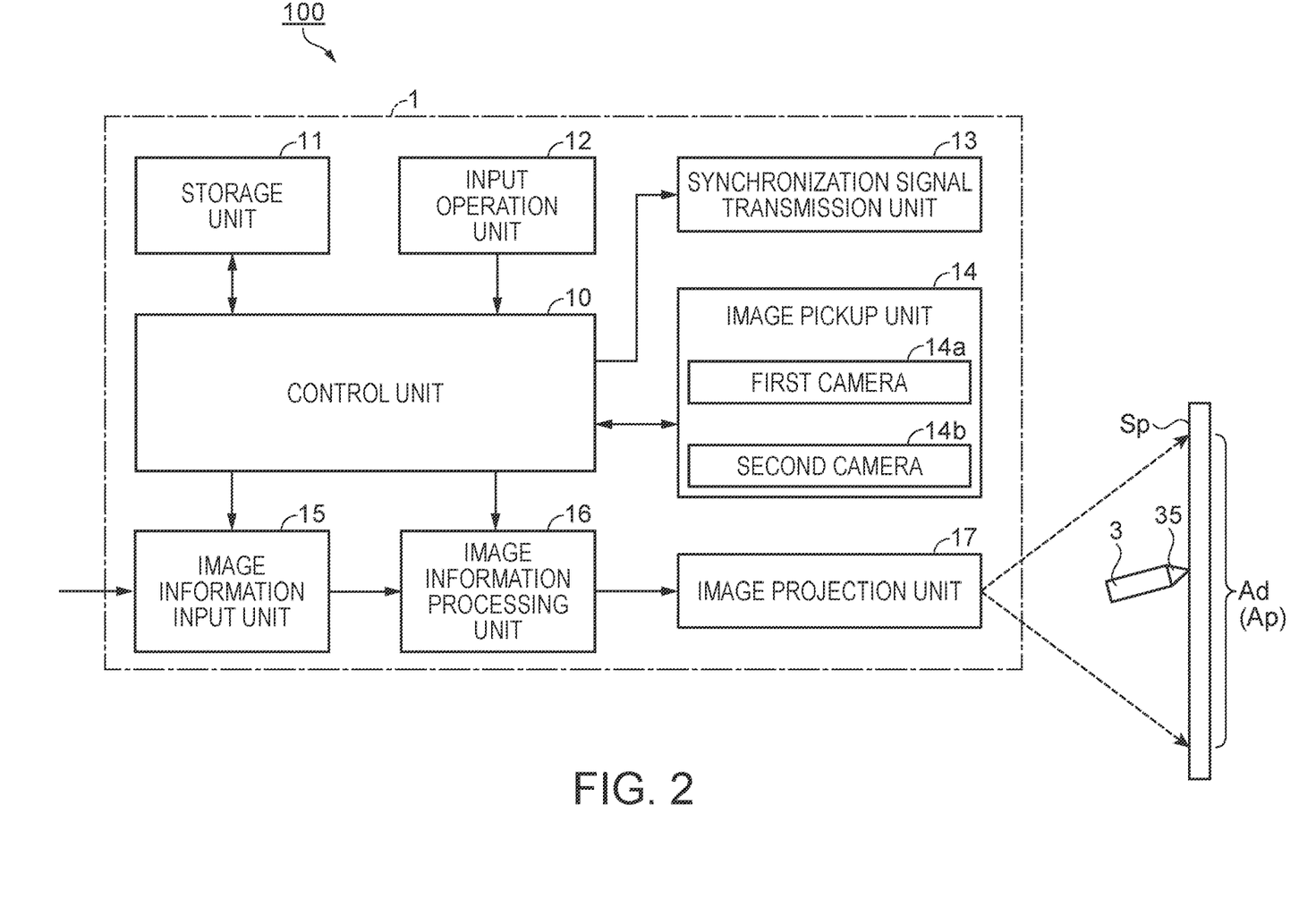
FIG. 2 is a block diagram showing a schematic configuration of a projector.
Figure 3:
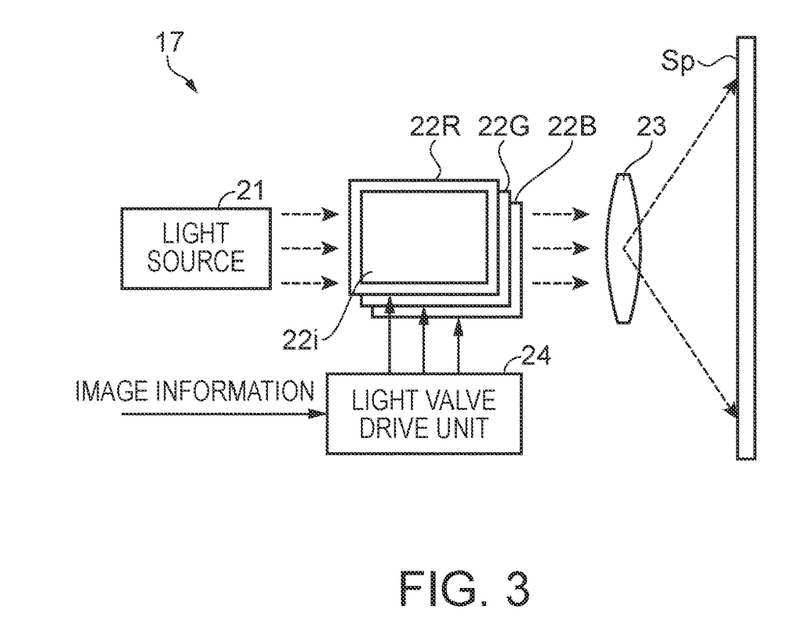
FIG. 3 is a block diagram showing a schematic configuration of an image projection unit provided in the projector.

FIG. 2 is a block diagram showing a schematic configuration of the projector 1. FIG. 3 is a block diagram showing a schematic configuration of an image projection unit 17 provided in the projector 1.

As shown in FIG. 2, the projector 1 has, as an integrated configuration, a control unit 10, a storage unit 11, an input operation unit 12, a synchronization signal transmission unit 13, an image pickup unit 14, an image information input unit 15, an image information processing unit 16, and an image projection unit 17 as a display unit. The projector 1 projects an image onto the projection surface Sp from the image projection unit 17, based on image information inputted to the image information input unit 15.

The control unit 10 has one or a plurality of processors and operates according to a control program stored in the storage unit 11, thus comprehensively controlling operations of the projector 1.

The storage unit 11 has memories such as a RAM (random access memory) and a ROM (read only memory) or the like. The RAM is used to temporarily store various data or the like. The ROM stores the control program and control data or the like to control operations of the projector 1. The storage unit 11 may also store image information to be projected from the image projection unit 17.

The input operation unit 12 has a plurality of operation keys for the user to give various instructions to the projector 1. The operation keys provided in the input operation unit 12 include a "power key" to switch the power on and off, a "menu key" to display a menu for various settings, a "direction key" to select a menu item, and the like. If the user operates the various operation keys of the input operation unit 12, the input operation unit 12 outputs an operation signal corresponding to the content of the operation by the user, to the control unit 10. Also, a remote controller (not illustrated) capable of remote control may be used as the input operation unit 12. In this case, the remote controller issues an infrared operation signal corresponding to the content of the operation by the user. A remote control signal receiving unit, not illustrated, receives this signal and transmits the signal to the control unit 10.

The synchronization signal transmission unit 13 has a light emitting unit for transmitting a pulse signal for synchronization (synchronization signal) to the light pen 3. As the light source of the light emitting unit, for example, an LED (light emitting diode) which emits infrared light is used. The synchronization signal transmission unit 13, under the control of the control unit 10, causes the light emitting unit to emit light periodically (for example, at a frequency of about several ten hertz) and thus transmits a synchronization signal to the light pen 3. The light pen 3 periodically receives the synchronization signal and causes the light emitting unit 35 to emit light repeatedly at a timing synchronized with the received synchronization signal.

The image pickup unit 14 includes a first camera 14a and a second camera 14b arranged at a predetermined distance from each other. Each of the first camera 14a and the second camera 14b is a camera having an image pickup element (not illustrated) such as a CCD (charge-coupled device) sensor or CMOS (complementary metal-oxide semiconductor) sensor. The first camera 14a and the second camera 14b have an infrared transmission filter which absorbs visible light and transmits infrared light. The first camera 14a and the second camera 14b thus pick up an image of infrared light emitted from the light pen 3, via this infrared transmission filter. The image pickup unit 14 picks up an image of the detection area Ad on the projection surface Sp under the control of the control unit 10 and outputs image information (picked-up image information) as the result of the image pickup to the control unit 10. The control unit 10 causes the image pickup unit 14 to pick up an image at a timing synchronized with the synchronization signal transmitted from the synchronization signal transmission unit 13. That is, the image pickup unit 14 repeats image pickup at the timing when the light pen 3 emits light.

The image information input unit 15 is connected to an external image supply device (not illustrated) such as a computer or image playback device and receives image information supplied from the image supply device. The image information input unit 15 can also receive image information stored in the storage unit 11 and supplied from the control unit 10. The image information input unit 15 outputs the inputted image information, that is, image information representing an inputted image, to the image information processing unit 16.

The image information processing unit 16, under the control of the control unit 10, carries out various kinds of processing on the image information inputted from the image information input unit 15 and outputs the processed image information to a light valve drive unit 24 (see FIG. 3) of the image projection unit 17. For example, the image information processing unit 16 processes the image information by adjusting image quality such as brightness and contrast, or by superimposing an OSD (on-screen display) image such as a drawn image or menu image onto the input image, according to need.

The image information input unit 15 and the image information processing unit 16 may be formed by one or a plurality of processors, or may be formed by a dedicated processing device such as ASIC (application specific integrated circuit) or FPGA (field programmable gate array).

As shown in FIG. 3, the image projection unit 17 has a light source 21, three liquid crystal light valves 22R, 22G, 22B as an optical modulator, a projection system 23, a light valve drive unit 24, and the like. In the image projection unit 17, the liquid crystal light valves 22R, 22G, 22B modulate light emitted from the light source 21 and thus form image light, and the projection system 23 including at least one of a lens and a mirror projects the image light. The image projection unit 17 thus displays an image on the projection surface Sp.

The light source 21 includes a discharge-type light source lamp such as an ultra-high-pressure mercury lamp or metal halide lamp, or a solid-state light source such as a light emitting diode or semiconductor laser. The light emitted from the light source 21 is converted into light with substantially even luminance distribution by an optical integration system, not illustrated. The light is then separated into color light components of the primary colors of light, red (R), green (G), and blue (B), by a color separation system, not illustrated. Subsequently, the color light components become incident on the corresponding liquid crystal light valves 22R, 22G, 22B.

Each of the liquid crystal light valves 22R, 22G, 22B includes a transmission-type liquid crystal panel or the like made up of a pair of transparent substrate with a liquid crystal enclosed between them. In each liquid crystal panel, a rectangular image forming area 22i made up of a plurality of pixels arranged in the form of a matrix is formed. A drive voltage can be applied to the liquid crystal at each pixel.

The light valve drive unit 24 forms an image in the image forming area 22i of the liquid crystal light valves 22R, 22G, 22B. Specifically, the light valve drive unit 24 applies a drive voltage corresponding to image information inputted from the image information processing unit 16, to each pixel of the image forming area 22*i*, and sets each pixel to a light transmittance corresponding to the image information. The light emitted from the light source 21 is transmitted through the image forming area 22*i* of the liquid crystal light valves 22R, 22G, 22B, is thus modulated at each pixel, and forms image light corresponding to the image information for each color light component. The resulting image light of each color is combined at each pixel by a light combining system, not illustrated, and thus forms image light that represents a color image. The image light is then projected in an enlarged form on the projection surface Sp by the projection system 23. Consequently, an image based on the image information inputted to the image information input unit 15 is displayed on the projection surface Sp.

Figure 4:
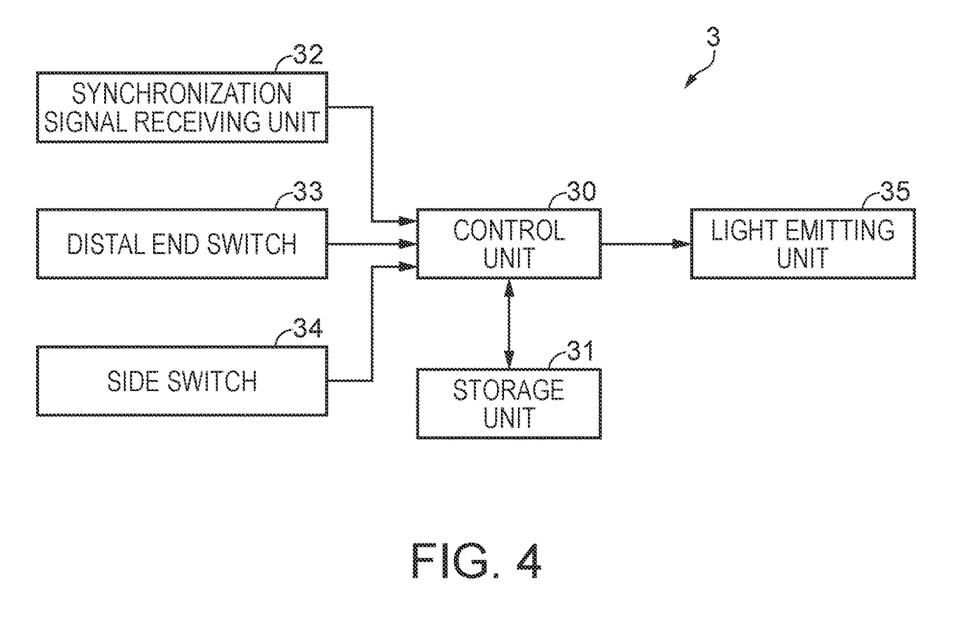
FIG. 4 is a block diagram showing a schematic configuration of a light pen.

FIG. 4 is a block diagram showing a schematic configuration of the light pen 3.

As shown in FIG. 4, the light pen 3 has a control unit 30, a storage unit 31, a synchronization signal receiving unit 32, a distal end switch 33, a side switch 34, and a light emitting unit 35.

The control unit 30 has one or a plurality of processors and operates according to a control program stored in the storage unit 31, thus comprehensively controlling operations of the light pen 3.

The storage unit 31 is made up of a memory or the like which stores the control program and control data or the like for controlling operations of the light pen 3.

The synchronization signal receiving unit 32 is made up of a light receiving element or the like which receives infrared light. The synchronization signal receiving unit 32 receives a synchronization signal (infrared pulse signal) transmitted periodically from the synchronization signal transmission unit 13 of the projector 1 and outputs the synchronization signal to the control unit 30.

The distal end switch 33 is arranged at a distal end part of the light pen 3 (tip of the pen). When an operation of pressing the distal end part against the projection surface Sp is carried out or the like, the distal end switch 33 detects the pressing of the distal end part and outputs the result of the detection to the control unit 30.

The side switch 34 detects an operation (press) by the user on the operation button 34*a* arranged on the lateral side of the light pen 3 and outputs the result of the detection to the control unit 30.

The light emitting unit 35 has a light source (for example, LED) arranged near the distal end part of the light pen 3 and emits infrared light under the control of the control unit 30. The control unit 30 causes the light emitting unit 35 to repeatedly emit light synchronously with the synchronization signal periodically received by the synchronization signal receiving unit 32. Specifically, the control unit 30 divides, for example, one cycle of the synchronization signal into a plurality of periods (hereinafter also referred to as "phases"). The control unit 30 causes the light emitting unit 35 to emit light without exception during several predetermined phases (hereinafter referred to as "position detection phases"), of the plurality of phases. During the other phases (hereinafter referred to as "state determination phases"), the control unit 30 decides whether to cause the light emitting unit 35 to emit light or not, based on the states of the distal end switch 33 and the side switch 34 (whether these switches are pressed or not). The control unit 30 then notifies the projector 1 of the state of the distal end switch 33 and the state of the side switch 34 in the form of transition in the light emission state (hereinafter also referred to as "light emission sequence") of the light emitting unit 35 over a plurality of cycles.

Figure 5:
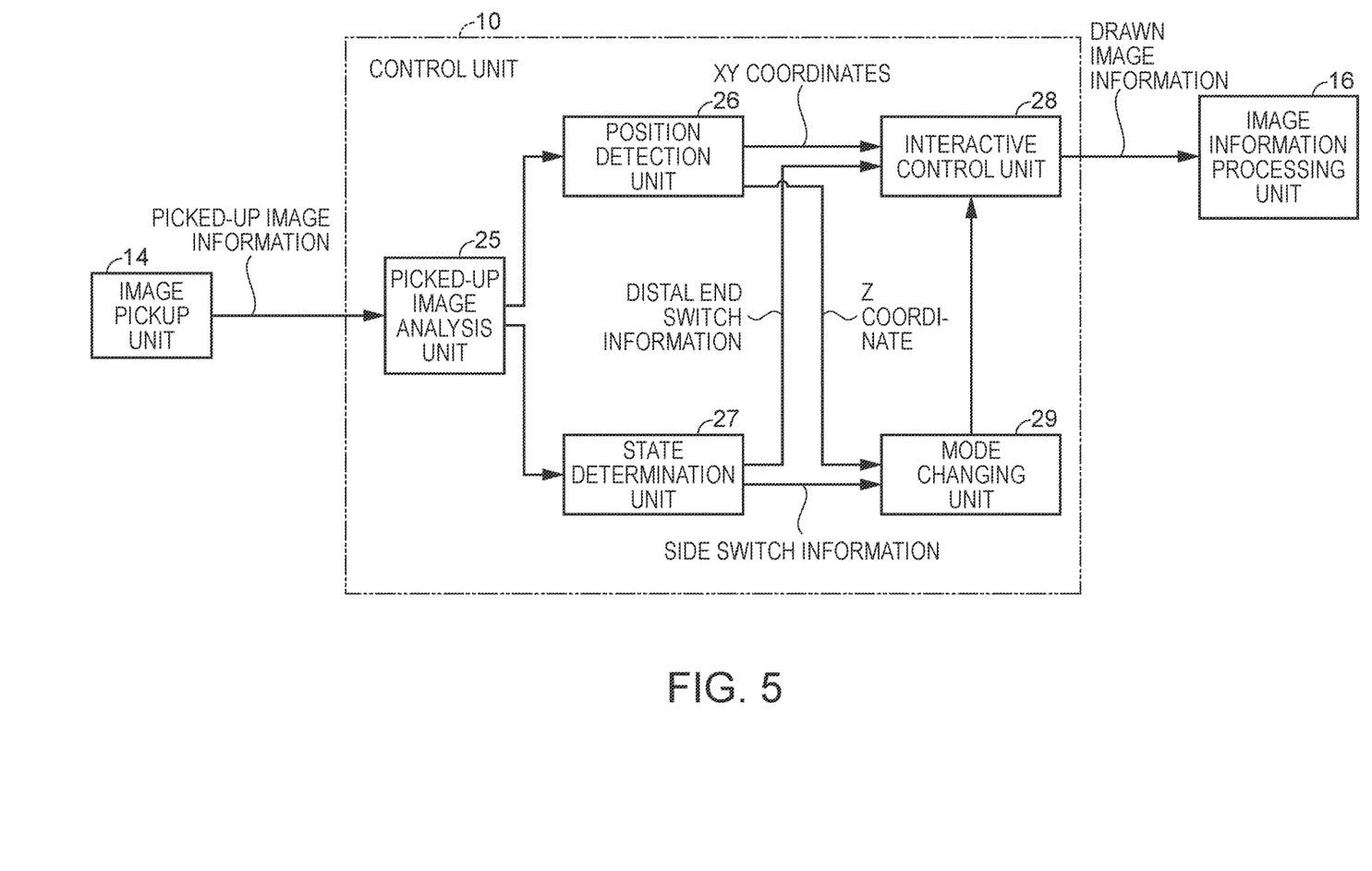
FIG. 5 is a block diagram showing a schematic configuration of a control unit of the projector.

FIG. 5 is a block diagram showing a schematic configuration of the control unit 10 of the projector 1. As shown in FIG. 5, the control unit 10 has a picked-up image analysis unit 25, a position detection unit 26, a state determination unit 27, an interactive control unit 28, and a mode changing unit 29, as functional blocks implemented by the control program.

The picked-up image analysis unit 25 analyzes each of images based on picked-up image information inputted from the image pickup unit 14, that is, each of picked-up images repeatedly picked up by the first camera 14*a* and the second camera 14*b*, and extracts the light emitted from the light pen 3 from the detection area Ad in the picked-up images. The picked-up image analysis unit 25 determines an image of infrared light having a size within a predetermined range, of the images of infrared light included in the detection area Ad in the picked-up images, as the light emitted from the light pen 3, and therefore extracts this image of infrared light. The picked-up image analysis unit 25 determines an image of infrared light having a size out of the predetermined range, as a noise, and therefore does not extract this image of infrared light.

The position detection unit 26 detects a designated position designated by the light pen 3, based on the result of analyzing a picked-up image picked up during the position detection phase, of the result of the analysis by the picked-up image analysis unit 25. In this embodiment, images are picked up using two cameras. Therefore, the three-dimensional position of the designated position designated by the light pen 3 can be detected, based on the principle of triangulation. Specifically, as the coordinates of the designated position designated by the light pen 3, the position detection unit 26 detects XY coordinates expressing the position on the projection surface Sp and Z coordinate representing the distance from the projection surface Sp. Here, a correspondence between XY coordinates on an input image and XY coordinates on a picked-up image is established in advance by calibration. The position detection unit 26 can convert the XY coordinates of the designated position extracted on the picked-up image into the XY coordinates on the input image. The position detection unit 26 outputs the converted XY coordinates of the designated position to the interactive control unit 28 and outputs the Z coordinate of the designated position to the mode changing unit 29.

The state determination unit 27 recognizes the light emission sequence of the light pen 3, based on the result of analyzing the picked-up image picked up during the state determination phase over a plurality of cycles, of the result of the analysis by the picked-up image analysis unit 25. The state determination unit 27 then distinguishes the state of the distal end switch 33 of the light pen 3 from the state of the side switch 34, based on the recognized light emission sequence. The state determination unit 27 outputs information representing the determined state of the distal end switch 33 (distal end switch information) to the interactive control unit 28 and outputs information representing the state of the side switch 34 (side switch information) to the mode changing unit 29.

The interactive control unit 28 controls operations of the projector 1, based on the XY coordinates of the designated position specified by the position detection unit 26 and the state of the distal end switch 33 determined by the state determination unit 27. For example, the interactive control unit 28 causes the image information processing unit 16 to carry out processing to display the pointer on the designated position (XY coordinates) as superimposed on the input image detected by the position detection unit 26. If the designated position (XY coordinates) designated by the light pen 3 moves in the state where the distal end switch 33 is pressed, the interactive control unit 28 carries out processing to draw a line or the like along the trajectory of the designated position, that is, processing to generate a drawn image, and causes the image information processing unit 16 to carry out processing to display the generated drawn image as superimposed on the input image. Also, if the distal end switch 33 of the light pen 3 is pressed when a certain menu image is projected, the interactive control unit 28 carries out processing to select a menu item or the like, based on the designated position (XY coordinates).

The mode changing unit 29 changes the drawing mode of the projector 1, based on the Z coordinate of the designated position specified by the position detection unit 26 and the state of the side switch 34 determined by the state determination unit 27. The drawing mode is setting information which defines in which form the drawing is to be carried out, when carrying out the processing to draw a line or the like along the trajectory of the designated position (XY coordinates). When the operation button 34a is pressed, the mode changing unit 29 changes the drawing mode, based on the Z coordinate of the designated position at the time.

Figure 6:
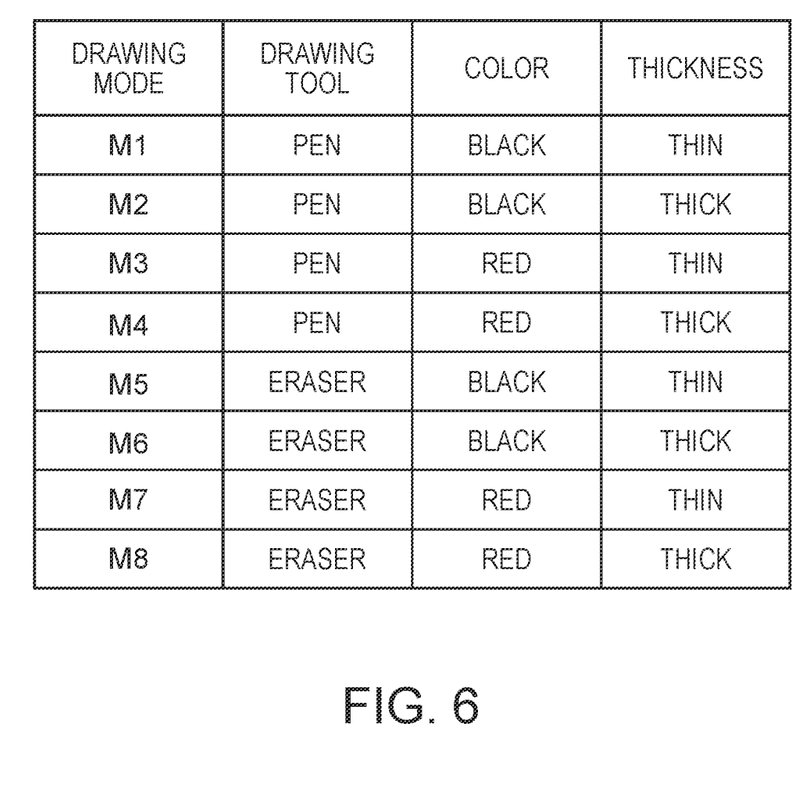
FIG. 6 shows a list of drawing modes of the projector.

FIG. 6 shows a list of drawing modes of the projector 1.

As shown in FIG. 6, in this embodiment, drawing can be carried out in eight drawing modes M1 to M8. Each drawing mode is decided based on three parameters. The first parameter indicates the drawing tool. One of the choices of "pen" for drawing a line along the trajectory of the designated position and "eraser" for erasing a drawn line along the trajectory of the designated position is selected. The second parameter indicates the color of the pen. One of the choices of "black" for drawing a line in black and "red" for drawing a line in red is selected. The third parameter indicates the thickness of the pen and the eraser. One of the choices of "thin" indicating that the width of a line or the width of erasure is relatively narrow and "thick" indicating that the width is relatively broad is selected. The drawing mode to be employed is decided based on the combination of the respective choices of the three parameters. However, since the operation in the case where "eraser" is selected as the drawing tool is not affected by the color of the pen, M5 and M7 are substantially the same drawing mode and M6 and M8 are substantially the same drawing mode.

The user can change the drawing mode by operating the operation button 34a of the light pen 3. At this time, the user can designate the parameter to be changed according to the Z coordinate of the designated position when operating the operation button 34a.

Figure 7:
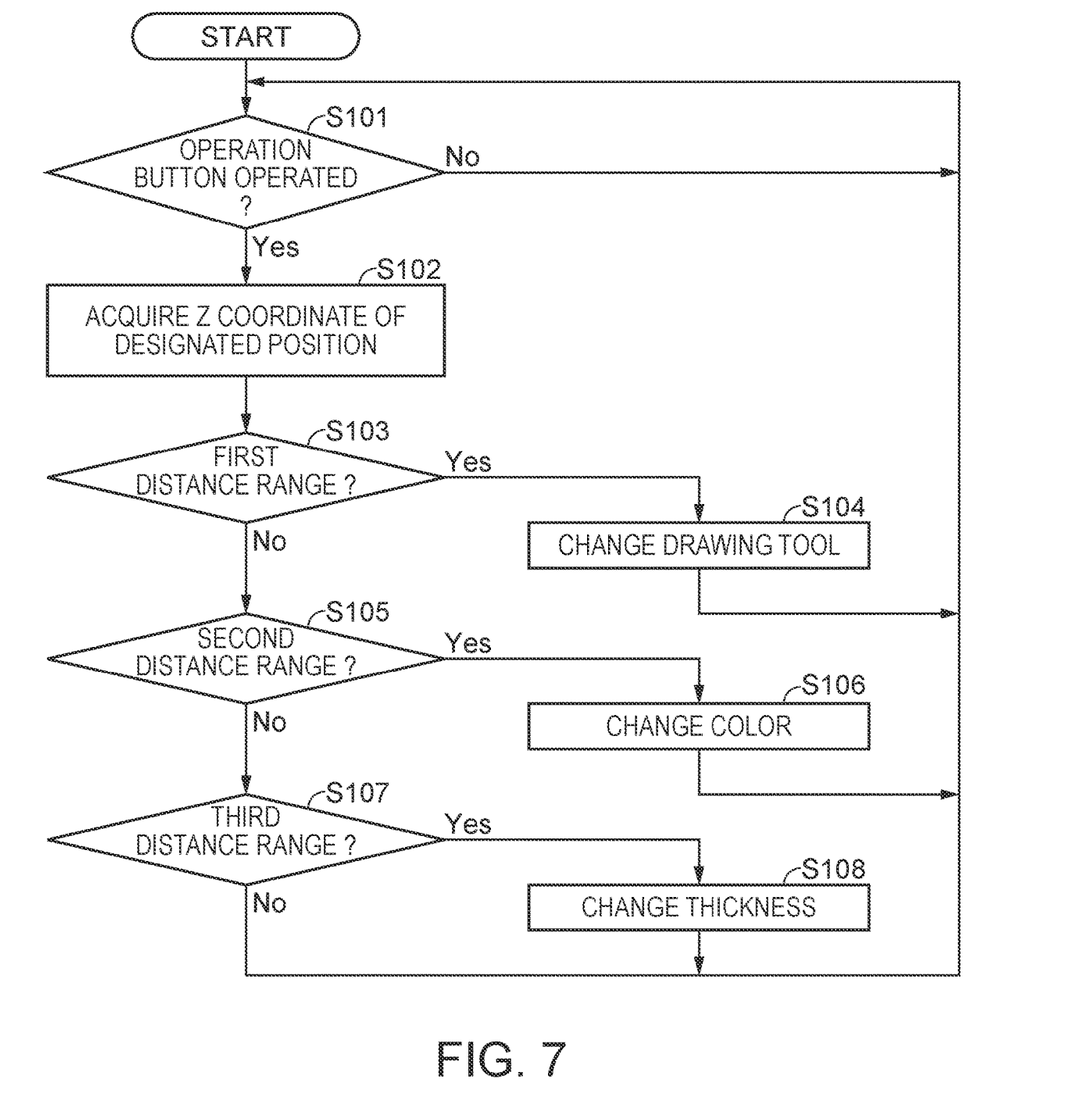
FIG. 7 is a flowchart for explaining operations of a mode changing unit.
Figure 8:
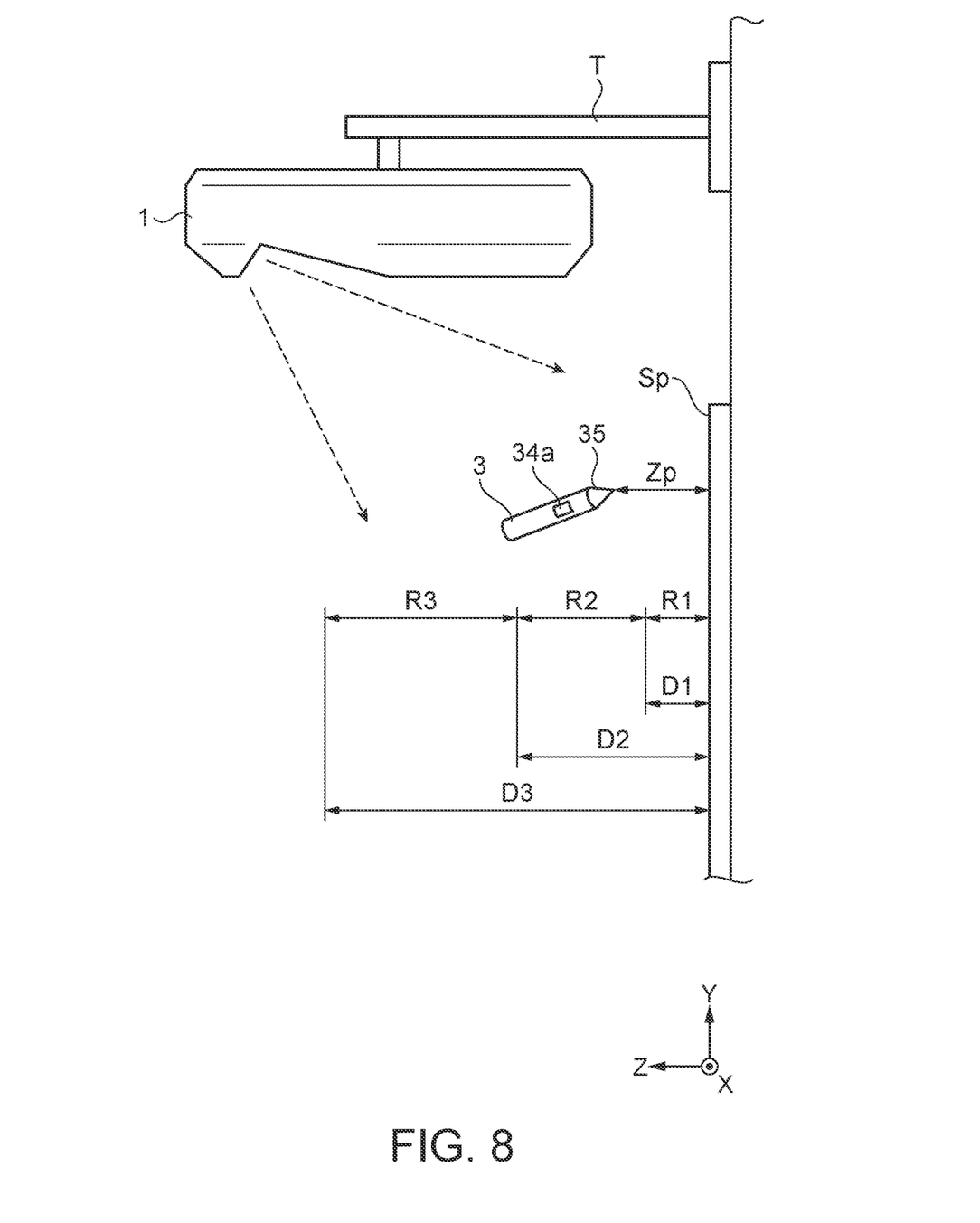
FIG. 8 is an explanatory view for explaining operations of the mode changing unit, where a projection surface is viewed from the side.

FIG. 7 is a flowchart for explaining operations of the mode changing unit 29. FIG. 8 is an explanatory view for explaining operations of the mode changing unit 29, where the projection surface Sp is viewed from the side.

As shown in FIG. 7, in step S101, the mode changing unit 29 determines whether the operation button 34a is operated by the user or not, based on the state of the side switch 34 determined by the state determination unit 27. If the operation button 34a is operated, the mode changing unit 29 shifts the processing to step S102. If the operation button 34a is not operated, the mode changing unit 29 repeats this step.

When the processing shifts to step S102 because the operation button 34a is operated, the mode changing unit 29 acquires, from the position detection unit 26, the Z coordinate Zp of the designated position (see FIG. 8) taken when the operation button 34a is pressed.

In step S103, the mode changing unit 29 determines whether the acquired Z coordinate Zp of the designated position is included in a distance range R1 (first distance range) or not. If the Z coordinate on the surface of the projection surface Sp is 0 and the direction perpendicularly to the front (to the user side) from the projection surface Sp is defined as +Z direction, as shown in FIG. 8, the distance range R1 is a range where the Z coordinate is 0 or greater, and less than a distance D1. The distance D1 is, for example, 50 mm. In this case, the distance range R1 has a width of 50 mm. If the acquired Z coordinate Zp of the designated position is included in the distance range R1, the mode changing unit 29 shifts the processing to step S104. If the acquired Z coordinate Zp of the designated position is not included in the distance range R1, the mode changing unit 29 shifts the processing to step S105.

When the processing shifts to step S104 because the acquired Z coordinate Zp of the designated position is included in the distance range R1, the mode changing unit 29 changes the parameter indicating the drawing tool and returns the processing to step S101. Specifically, if the currently selected drawing tool is "pen", the mode changing unit 29 changes the drawing tool to "eraser". If the currently selected drawing tool is "eraser", the mode changing unit 29 changes the drawing tool to "pen".

When the processing shifts to step S105 because the acquired Z coordinate Zp of the designated position is not included in the distance range R1, the mode changing unit 29 determines whether the acquired Z coordinate Zp of the designated position is included in a distance range R2 (second distance range) or not. As shown in FIG. 8, the distance range R2 is a range where the Z coordinate is equal to or greater than the distance D1 and less than a distance D2. If, for example, the distance D2 is 150 mm and the distance D1 is 50 mm, the distance range R2 has a width of 100 mm. If the acquired Z coordinate Zp of the designated position is included in the distance range R2, the mode changing unit 29 shifts the processing to step S106. If the acquired Z coordinate Zp of the designated position is not included in the distance range R2, the mode changing unit 29 shifts the processing to step S107.

When the processing shifts to step S106 because the acquired Z coordinate Zp of the designated position is included in the distance range R2, the mode changing unit 29 changes the parameter indicating the color of the pen and returns the processing to step S101. Specifically, if the currently selected color of the pen is "black", the mode changing unit 29 changes the color of the pen to "red". If the currently selected color of the pen is "red", the mode changing unit 29 changes the color of the pen to "black".

When the processing shifts to step S107 because the acquired Z coordinate Zp of the designated position is not included in the distance range R2, the mode changing unit 29 determines whether the acquired Z coordinate Zp of the designated position is included in a distance range R3 (third distance range) or not. As shown in FIG. 8, the distance range R3 is a range where the Z coordinate is equal to or greater than the distance D2 and less than a distance D3. If, for example, the distance D3 is 300 mm and the distance D2 is 150 mm, the distance range R3 has a width of 150 mm. If the acquired Z coordinate Zp of the designated position is included in the distance range R3, the mode changing unit 29 shifts the processing to step S108. Meanwhile, if the acquired Z coordinate Zp of the designated position is not included in the distance range R3, the mode changing unit 29 returns the processing to step S101 without carrying out the processing to change the drawing mode (parameter).

When the processing shifts to step S108 because the acquired Z coordinate Zp of the designated position is included in the distance range R3, the mode changing unit 29 changes the parameter indicating the thickness of the pen and the eraser and returns the processing to step S101. Specifically, if the currently selected thickness is "thin", the mode changing unit 29 changes the thickness to "thick". If the currently selected thickness is "thick", the mode changing unit 29 changes the thickness to "thin".

In this way, if the user operates the operation button 34a of the light pen 3 within the range less than the distance D3 from the projection surface Sp, the mode changing unit 29 changes only the parameter corresponding to the distance from the projection surface Sp, of the parameters constituting the drawing mode, and does not change the other parameters. For example, if the user places the designated position in the distance range R3 and operates the operation button 34a when the current drawing mode is M1 (drawing tool—"pen", color—"black", thickness—"thin"), the thickness is changed from "thin" to "thick" and the drawing mode is changed to M2 (drawing tool—"pen", color—"black", thickness—"thick"). If the user places the designated position in the distance range R2 and operates the operation button 34a when the current drawing mode is M1 (drawing tool—"pen", color—"black", thickness—"thin"), the color of the penis changed from "black" to "red" and the drawing mode is changed to M3 (drawing tool—"pen", color—"red", thickness—"thin").

After the drawing mode is changed, if the user presses the distal end of the light pen 3 against the projection surface Sp and carries out an operation of drawing with the light pen 3, the interactive control unit 28 generates a drawn image corresponding to the drawing operation, based on the changed drawing mode. For example, if the drawing mode after change is M1 (drawing tool—"pen", color—"black", thickness—"thin"), the interactive control unit 28 draws a thin black line along the trajectory of the designated position (XY coordinates). Meanwhile, if the drawing mode is M6 (drawing tool—"eraser", color—"black", thickness—"thick") or M8 (drawing tool—"eraser", color—"red", thickness—"thick"), the interactive control unit 28 erases a drawn line in the shape of a thick line along the trajectory of the designated position (XY coordinates). The interactive control unit 28 successively outputs image information of the generated drawn image (drawn image information) to the image information processing unit 16 and causes the image information processing unit 16 to carry out processing to superimpose the drawn image on the input image.

As described above, the image projection system 100, the projector 1, and the control method for these according to the embodiment can achieve the following effects.

(1) In the embodiment, the mode changing unit 29 changes the drawing mode according to the Z coordinate Zp of the designated position when the operation button 34a provided on the light pen 3 is operated, that is, the distance between the light pen 3 and the projection surface Sp when the operation button 34a is operated. Therefore, the user can easily change the form of the drawn image without using a tool bar. Thus, convenience for the user is improved.

(2) In the embodiment, for the drawing mode decided based on a plurality of parameters (drawing tool, color of pen, thickness of pen or the like), different parameters are changed according to the Z coordinate Zp of the designated position when the operation button 34a of the light pen 3 is operated. Therefore, the user can easily change a desired parameter, of the plurality of parameters constituting the drawing mode.

(3) In the embodiment, the parameter indicating the drawing tool is associated with the distance range R1. Therefore, it is possible to easily switch between the drawing mode for drawing along the trajectory of the designated position and the drawing mode for erasing a drawn image along the trajectory of the designated position.

(4) In the embodiment, the parameter indicating the color of the pen is associated with the distance range R2. Therefore, it is possible to easily switch between the drawing mode for drawing a black line along the trajectory of the designated position and the drawing mode for drawing a red line.

(5) In the embodiment, the parameter indicating the thickness of the pen and the eraser is associated with the distance range R3. Therefore, it is possible to easily switch between the drawing mode for drawing a thin line along the trajectory of the designated position and the drawing mode for drawing a thick line.

(6) In the embodiment, the distance ranges R1 to R3 are set in such a way that a distance range further away from the projection surface Sp has a broader width. Therefore, it is possible to compensate for a reduction in accuracy as it goes away from the projection surface Sp when the user estimates the distance between the light pen 3 and the projection surface Sp.

In the embodiment, when detecting the Z coordinate of the designated position, the position detection unit 26 is equivalent to a distance detection unit which detects the distance between the projection surface Sp and the light pen 3. When determining whether the operation button 34a is operated by the user or not, based on the state of the side switch 34 determined by the state determination unit 27, the mode changing unit 29 is equivalent to a determination unit. When changing the drawing mode, the mode changing unit 29 is equivalent to a processing unit. When carrying out the processing to generate a drawn image along the trajectory of the designated position, the interactive control unit 28 is equivalent to a generation unit.

Modifications

The embodiment may be modified as follows.

In the embodiment, the Z coordinate Zp of the designated position is detected, based on picked-up images picked by the two cameras (first camera 14a and second camera 14b). However, this configuration is not limiting. For example, a method of projecting structured light, a TOF (time of flight) method or the like may be used to find the Z coordinate Zp of the light pen 3 (designated position). Also, a distance measuring unit which measures the distance to the projection surface Sp may be provided in the light pen 3, and the result of the measurement may be transmitted to the projector 1.

In the embodiment, the light pen 3 notifies the projector 1 of the states of the distal end switch 33 and the side switch 34 in the form of the light emission sequence of the light emitting unit 35. However, this configuration is not limiting. For example, both the projector 1 and the light pen 3 may be provided with a communication unit for wireless communication by Bluetooth (trademark registered) or the like, and the light pen 3 may notify the projector 1 of the states of the switches via these communication units. In this case, the projector 1 may transmit a synchronization signal to the light pen 3 via the communication units.

In the embodiment, the image pickup unit 14 is configured to pick up an image of infrared light emitted from the light pen 3. However, this configuration is not limiting. For example, the image pickup unit 14 may pick up an image of visible light, and the pointer may be detected from the picked-up image by pattern matching, edge detection or the like. Such a configuration eliminates the need to use a pointer which emits light, such as the light pen 3.

In the embodiment, the drawing mode is decided based on the three parameters of drawing tool, color, and thickness. However, the number of parameters that define the drawing mode is not limited to three and may be less than three or may be four or more. The parameters that define the drawing mode may include a parameter indicating a line type (for example, solid line, dashed line or the like). The drawing modes may include a drawing mode for drawing a rectangle or a drawing mode for drawing a circle or the like.

In the embodiment, each parameter (drawing tool, color, thickness) includes two choices. However, the number of choices is not limited to two and may be three or more. For example, choices of the parameter indicating the color of the pen may include "blue" as well as "black" and "red". In this case, every time the operation button 34a is operated, the choice to make may cyclically change, for example, in order from "black", "red", "blue", "black" and so on. Thus, even if there are three or more choices, it is possible to easily switch among these choices.

In the embodiment, the distance range R1 corresponds to the drawing tool, the distance range R2 corresponds to the color of the pen, and the distance range R3 corresponds to the thickness of the pen and the eraser. However, the correspondence between the distance ranges R1 to R3 and the parameters is not limited to this example.

Also, the user may arbitrarily set a correspondence between the distance ranges R1 to R3 and the parameters (drawing tool, color, thickness). For example, the control unit 10 may instruct the image information processing unit 16 to display, in a superimposed form, a menu image for establishing a correspondence between the distance ranges R1 to R3 and parameters, thus allowing the user to set an arbitrary parameter for each of the distance ranges R1 to R3 via this menu image. The control unit 10 establishes a correspondence between the distance ranges R1 to R3 and the parameters, based on the result of the setting by the user. With such a configuration, for example, a parameter which is changed at a high frequency can be made to correspond to the distance range R1 close to the projection surface Sp. Thus, convenience in changing the drawing mode can be improved further. In this configuration, when establishing the correspondence between the distance ranges R1 to R3 and the parameters, based on the result of the setting by the user, the control unit 10 is equivalent to an operation setting unit. Also, the user may be allowed to arbitrarily set the number of choices of the parameter (for example, the number of pen colors) and the type (for example, the color of the pen included in the choices), using the menu image.

In the embodiment, the distance ranges R1 to R3 are decided, based on whether the Z coordinate Zp of the designated position is equal to or greater than the distances D1, D2, D3 as thresholds, or less than these thresholds. However, this configuration is not limiting. For example, a disable range where an operation of the operation button 34a is disabled may be provided between the distance ranges R1 and R2 and between the distance ranges R2 and R3. Such a configuration can restrain change of an unexpected parameter when the Z coordinate Zp of the designated position is near a threshold.

In the embodiment, a configuration in which the control unit 10 (mode changing unit 29) carries out processing to change the drawing mode when the operation button 34a is operated is described. However, the processing carried out when the operation button 34a is operated is not limiting to changing the drawing mode. For example, the control unit 10 may carry out processing to change the image quality adjustment mode (color mode) of the projector 1 or processing to change the display state (enlargement or reduction or the like) of an image. If the operation button 34a is operated when a presentation slide is projected, the control unit 10 may carry out processing to transmit, to the image supply device, a command to proceed to the next slide or a command to return to the previous slide, based on the Z coordinate Zp of the designated position. Incases as described above, the control unit 10 is equivalent to a processing unit.

In the embodiment, the transmission-type liquid crystal light valves 22R, 22G, 22B are used as light modulation devices. However, reflection-type light modulation devices such as reflection-type liquid crystal light valves can be used. A digital mirror device or the like that modulates the light emitted from the light source 21 by controlling the direction in which the incident light exits for each micromirror as a pixel can also be used. Also, the configuration having a plurality of light modulation devices corresponding to respective color light components is not limiting. A single light modulation device may modulate a plurality of color light components in time division.

In the embodiment, the projector 1 is described as an example of the image display device. However, the image display device is not limited to the projector 1 and may be other image display devices such as liquid crystal display and organic EL display.

What is claimed is:

1. An image display device which displays an image on a display surface, the device comprising:
   a camera that functions as:
      a position detection unit which detects a designated position designated by a pointer on the display surface; and
      a distance detection unit which detects a distance between the display surface and the pointer;
   a processor that functions as:
      a determination unit which determines that an operation panel functioning as an operation unit provided on the pointer operated;
      a processing unit which carries out predetermined processing when it is determined that the operation unit operated; and
      a generation unit which generates a drawn image, based on a trajectory of the designated position; and
   a display unit which displays the drawn image on the display surface,
   wherein the processing unit carries out first processing when the distance is a first distance and it is determined that the operation unit is operated, and the processing unit carries out second processing which is different from the first processing when the distance is a second distance which is different from the first distance and it is determined that the operation unit is operated,
   wherein when a drawing mode for the generation of the drawn image is a first mode, the distance is the first distance, and it is determined that the operation unit is operated, the processing unit changes the drawing mode to a second mode which is different from the first mode, and when the drawing mode is the first mode, the distance is the second distance, and it is determined that the operation unit is operated, the processing unit changes the drawing mode to a third mode which is different from the first mode and the second mode, and the generation unit generates the drawn image in a form corresponding to the drawing mode changed by the processing unit.

2. The image display device according to claim 1, wherein each of the drawing modes is decided based on a first parameter and a second parameter, and the second mode is a drawing mode in which the first parameter is changed from the first mode and in which the second parameter is not changed, and the third mode is a drawing mode in which the second parameter is changed from the first mode and in which the first parameter is not changed.

3. The image display device according claim 1, wherein the first mode is a drawing mode for drawing along the trajectory of the designated position, and the second mode is a drawing mode for erasing the drawn image which is already drawn, along the trajectory of the designated position.

4. The image display device according to claim 1, wherein the first mode is a drawing mode for drawing a line in a first color along the trajectory of the designated position, and the second mode is a drawing mode for drawing a line in a second color which is different from the first color, along the trajectory of the designated position.

5. The image display device according to claim 1, wherein the first mode is a drawing mode for drawing a line with a first thickness along the trajectory of the designated position, and the second mode is a drawing mode for drawing a line with a second thickness which is different from the first thickness, along the trajectory of the designated position.

6. The image display device according to claim 1, wherein:

the processor further functions as an operation setting unit which establishes a correspondence between the distance and processing by the processing unit.

7. The image display device according to claim 1, wherein the second distance is longer than the first distance, and a distance range corresponding to the second distance is broader than a distance range corresponding to the first distance.

8. A control method for an image display device which displays an image on a display surface, the method comprising:

detecting a designated position designated by a pointer on the display surface;

detecting a distance between the display surface and the pointer;

determining that an operation panel functioning as an operation unit provided on the pointer is operated;

carrying out by a processor first processing when the distance is a first distance and it is determined that the operation unit is operated, and carrying out by the processor second processing which is different from the first processing when the distance is a second distance which is different from the first distance and it is determined that the operation unit is operated;

generating a drawn image, based on a trajectory of the designated position;

displaying the drawn image on the display surface;

when a drawing mode for the generation of the drawn image is a first mode, the distance is the first distance, and it is determined that the operation unit is operated, changing the drawing mode to a second mode which is different from the first mode, and when the drawing mode is the first mode, the distance is the second distance, and it is determined that the operation unit is operated, changing the drawing mode to a third mode which is different from the first mode and the second mode; and generating the drawn image in a form corresponding to the changed drawing mode.

* * * * *